July 9, 1963 F. F. EHRENHAFT 3,097,262

ANAMORPHOTIC TELEVISION SYSTEM

Filed March 6, 1956 2 Sheets-Sheet 1

INVENTOR:
Franz F. Ehrenhaft
BY: Michael S. Striker
agt.

INVENTOR:
Franz F. Ehrenhaft
BY :
Michael S. Striker
agt

United States Patent Office 3,097,262
Patented July 9, 1963

3,097,262

ANAMORPHOTIC TELEVISION SYSTEM

Franz F. Ehrenhaft, Forest Hills, N.Y., assignor to Uniscan Electronics Corporation, a corporation of New York Filed Mar. 6, 1956, Ser. No. 569,708
9 Claims. (Cl. 178—6.8)

The present invention relates to a new and improved television system. More particularly the present invention relates to a new and improved television system for producing a television image having an aspect ratio substantially corresponding to the selected aspect ratio of the field view to be televised. The present application is a continuation-in-part application of my original U.S. patent application Serial No. 536,673, filed on September 26, 1955, now abandoned.

The aspect ratio of an image is the ratio of the width of the image to the height thereof. In conventional television systems this ratio has been standardized at 4-to-3. Therefore the width of a televised image is substantially in the same order of magnitude as the height. It is known that the human eye sees more laterally than it does vertically in a ratio much greater than 4-to-3. Therefore, conventional television systems produce images which are not compatible with natural vision.

Because of the conventional 4-to-3 aspect ratio of the televised image, it is not possible to obtain a close-up in one dimension without simultaneously obtaining a close-up in the other dimension. Also, it is not possible to extend a view in one meridian without extending the view by substantially the same amount in the other meridian. That is, due to the 4-to-3 aspect ratio, if the entire height of a tall building is to be displayed on a screen, the pick-up camera must be moved a substantial distance from the building so that the width of the displayed image will be comparable to the height thereof. This of course prevents a close-up of a scene showing the entire height of a tall building.

In industrial television, television cameras are sometimes used to transmit images of various measuring gauges to one central location so that a control operator at one location can check the operation at various remote points of a manufacturing process. These gauges or measuring meters usually have indicator markings extending in either the horizontal or vertical directions. Therefore, it is difficult to obtain a close-up of the indication markings on the gauge or meter with the conventional 4-to-3 aspect ratio.

The present invention overcomes these difficulties by compressing the image in the television camera in a chosen direction and then expanding the image on the receiver tube in the same direction.

Accordingly, it is an object of the present invention to overcome the above-described disadvantages of conventional television systems.

Another object of the present invention is to provide a new and improved television system.

A further object of the preesnt invention is to provide a new and improved television system for producing a television image having an aspect ratio comparable to the aspect ratio of natural vision.

Still another object of the present invention is to provide a new and improved television system for producing a television image which is substantially greater in one direction than in the other direction.

An object of the present invention is also to provide a new and improved method and apparatus for producing a television image having an aspect ratio comporable to the aspect ratio of natural vision and having substantially equal resolution in both the horizontal and vertical directions.

Yet another object of the present invention is to provide a new and improved television image for use in theater projection television.

It is also an object of the present invention to provide a new and improved television image for use in wide screen theater television.

A still further object of the present invention is to provide a new and improved method for obtaining an electrically transmittable image that has been compressed in one meridian.

It is yet another object of the present invention to provide a new and improved receiver for use in a television system wherein the aspect ratio of the image displayed by the receiver may be varied by a single actuator-operated control means.

With the above objects in view, the present invention mainly consists of a television system for producing a television image from a field of view with a selected aspect ratio and including television camera means for optically producing an electrically transmittable image of the field of view having an intermediate aspect ratio different from the selected aspect ratio, and means for electrically reproducing the electrically transmittable image into a visible image having a final aspect ratio different from the intermediate aspect ratio.

The present invention also includes a method of producing a television image from a field of view with a selected aspect ratio and includes the steps of optically producing an electrically transmittable image of the field of view having an intermediate aspect ratio different from the selected aspect ratio, and electrically reproducing the electrically transmittable image into a visible image having a final aspect ratio different from the intermediate aspect ratio.

In another embodiment, the present invention uses in the transmitter of the new and improved television system a television pick-up tube, an aspect compressor lens positioned between the field of view and the television pick-up tube for producing thereon an electrically transmittable image of the field of view having an intermediate aspect ratio different from the selected aspect ratio, and means for scanning the electrically transmittable image with an electron beam for producing a series of electrical impulses proportional to the intensity of the electrically transmittable image.

In a further embodiment, the present invention uses in the receiver of the new and improved television system a cathode ray tube having a fluorescent screen and an electron beam, means for deflecting the electron beam of the cathode ray tube so that it impinges upon the fluorescent screen thereof to produce an image on the fluorescent screen having a predetermined aspect ratio, and means for varying, in a plurality of discrete steps, the aspect ratio of the image produced on the fluorescent screen.

In still another embodiment of the present invention, the electrically transmittable image of the field of view has an aspect ratio which is related to the aspect ratio $w/h$ of the field of view by an anamorphic factor S. The electrically transmittable image is transmitted with $n$ scanning lines per frame, $f$ frames per second and a band width of F megacycles per second, wherein S satisfies the equation:

$$S=\frac{kF}{w/hn^2f}$$

wherein $k$ is a television constant.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a block diagram showing the operational relationships between the various elements of the present invention;

FIG. 2, sub-FIG. 2*a* is a diagrammatic representation of an object to be televised;

Sub-FIG. 2*b* is the image obtained for the object shown in FIG. 2*a* in a television pick-up tube of a conventional television system;

Sub-FIG. 2*c* is the image obtained for the object shown in FIG. 2*a* in a television pick-up tube using the improved television system of the present invention;

Sub-FIG. 2*d* is a diagrammatic representation of the image obtained for the object shown in FIG. 2*a* in the receiver of a television system incorporating the principles of the present invention;

Figure 1:
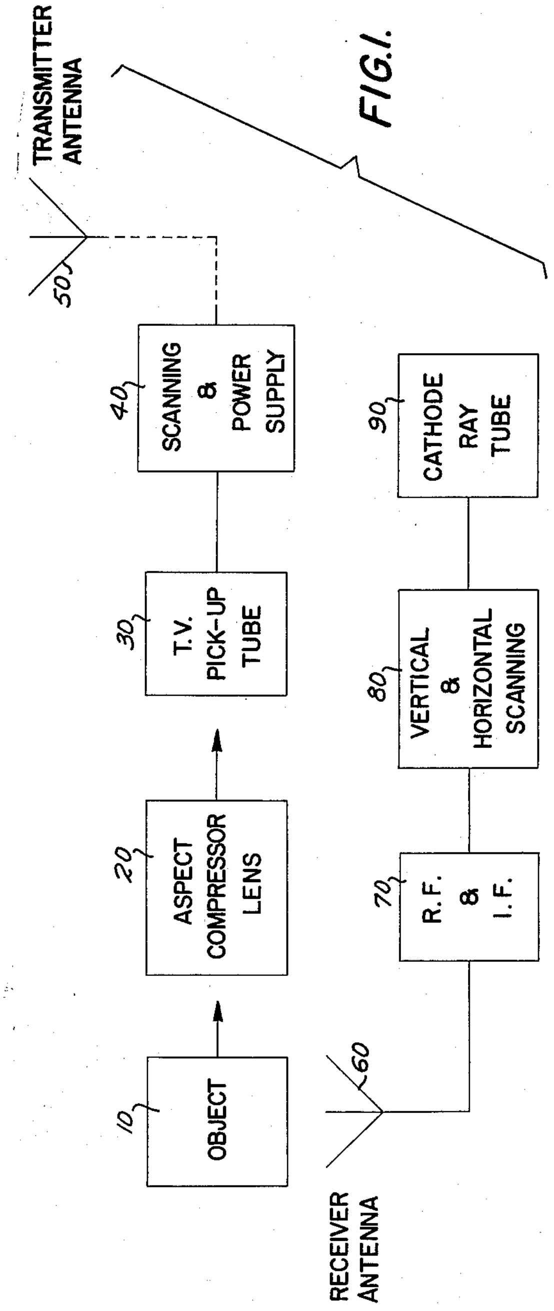

Referring now to the drawings and more particularly to FIG. 1 it can be seen that an aspect compressor lens 20 is positioned between the object or field of view 10 to be televised and a television pick-up tube 30. The aspect compressor lens compresses one meridian of the field of view so that the image in the pick-up tube 30 is compressed in the respective meridian.

Connected to the pick-up tube 30 are conventional scanning and video circuits and power supply 40. This circuit scans the image produced in the television pick-up tube and provides a series of electrical impulses proportional to the intensity of the image. The series of electrical impulses is then transmitted by a transmitter antenna 50 after they have been suitably modified and synchronized by the remaining elements (not shown) of the conventional transmitting system.

The transmitted impulses are received by the receiver antenna 60 and are applied through the radio frequency and intermediate frequency circuits 70 to the vertical and horizontal scanning and video circuits 80 of the television receiver. The vertical and horizontal scanning circuits are arranged to expand the image produced on the cathode ray tube 90 in the meridian that had previously been compressed by the aspect compressor lens 20.

Therefore it can be seen, that in accordance with the present invention, the transmitter includes television camera means for optically producing an electrically transmittable image of the field of view with an aspect ratio different from the selected aspect ratio of the field of view. This television camera means includes the aspect compressor lens 20 and the television pick-up tube 30. The electrically transmittable image is reproduced on the cathode ray tube 90 and the desired aspect ratio of the image reproduced on the tube 90 is obtained by having the proper relationship between the vertical and horizontal scanning circuits 80.

Figure 2:
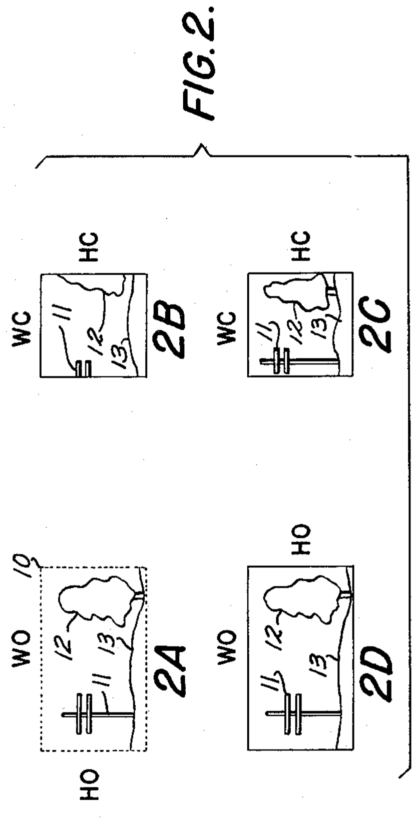

Referring now to FIG. 2, in sub-FIG. 2*a* is shown the field of view 10 wherein a panoramic scene is depicted. The field of view 10 has an as aspect ratio $Wo/Ho$ where W*o* is the width of the field of view and H*o* is the height thereof. The field of view 10 is shown surrounded by a dotted line to indicate that the selected aspect ratio $Wo/Ho$ is actually an arbitrary limit which depends upon the particular field of view sighted.

The view of the field of view 10 diagrammatically includes a telegraph pole 11, a tree 12 and a ground line 13. In the conventional system it is not possible to obtain a panoramic view of the field of view such as shown in sub-FIG. 2*a* unless the camera tube is moved a substantial distance away from the scene. This of course would materially reduce the height of the telegraph pole 11 and the tree 12.

If the heights of the telegraph pole 11 and the tree 12 are to be maintained substantially as shown in sub-FIG. 2*a* with a conventional television system, it would be impossible to obtain the panoramic view. Rather, the image produced in the television pick-up tube as shown in sub-FIG. 2*b* would only have a portion of the pole 11 and the tree 12 appear therein.

On the other hand, the image produced in the television pick-up tube as shown in sub-FIG. 2*c*, in accordance with the television system incorporating the principles of the present invention, will have the horizontal meridian compressed without changing the vertical meridian. Therefore, the height of the telegraph pole 11 and the tree 12 will remain the same as that shown in sub-FIG. 2*a* but the width thereof will be substantially compressed.

The aspect ratio of the images shown in sub-FIGS. 2*b* and 2*c* is equal to $Wc/Hc$, where W*c* is the width of the image and H*c* is the height thereof. It is known that for the best resolution of a televised image, it is preferable to have an aspect ratio of 1 for the image in the television pick-up tube. It can therefore be seen that an aspect ratio or 1 can be maintained in the pick-up tube used with the present invention, as shown in sub-FIG. 2*c*, while still containing all the desired features of the field of view 10 to be displayed.

In sub-FIG. 2*d*, the image is shown as displayed on the cathode ray tube of the receiver used with the television system incorporating the principles of the present invention. It can be seen that this image can be made to have an aspect ratio $Wo/Ho$ which is equal to the selected aspect ratio of the field of view shown in sub-FIG. 2*a*. This aspect ratio is produced by electrically expanding the horizontal meridian of the displayed image. It should of course be apparent that any desired aspect ratio can be obtained at the receiver and accordingly it is not necessary that this aspect ratio be equal to the selected aspect ratio.

Figures 3, 4, 5:
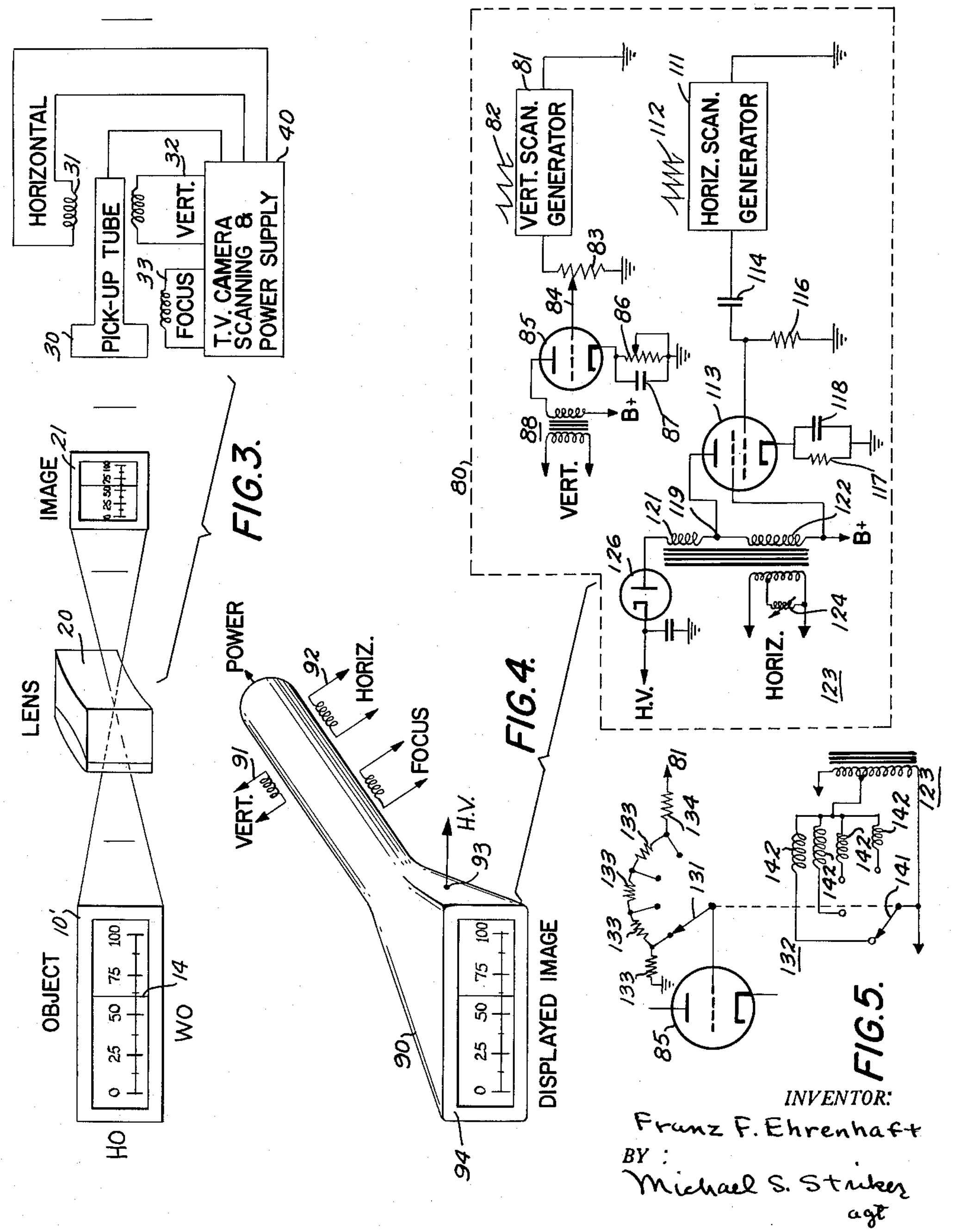
FIG. 3 is a diagrammatic representation of the transmitting portion of the new and improved television system.
FIG. 4 is a diagrammatic and schematic representation of the receiving portion of the new and improved television system.
FIG. 5 is an electrical schematic diagram of a circuit used for changing the aspect ratio in a television receiver.

Referring now to FIG. 3 the transmitting portion of the new and improved television system is shown. In this figure the object or field of view 10′ is the scale of an indicating meter. This illustration is chosen to show the applicability of the present invention to industrial television. At the original field of view 10′ it can be seen that the indicator 14 is positioned at approximately 65 on the scale. The light emitted from the field of view 10′ is transmitted through the aspect compressor lens 20 which compresses the horizontal meridian of the object so that an image 21 is obtained having an aspect ratio of 1. The lens 20 may be a conventional anamorphic lens incorporating cylindrical elements. Refracting prisms may also be used for the same purpose.

The compressed image 21 having an aspect ratio 1 is shown in FIG. 3 substantially as it appears in the image plane of the television pick-up tube 30. The conventional pick-up tube 30 contains a scanning electron beam which is deflected by horizontal and vertical deflection coils 31 and 32, respectively, and is focused on the image plane thereof by a focusing coil 33. The proper synchronizing and scanning voltages for the coils 31, 32 and 33 are obtained from the scanning circuit and power supply 40. The operating potentials for the pick-up tube 30 are also supplied from the power supply 40.

In a manner well known in the art, the scanning electron beam in the television pick-up tube 30 produces a series of electrical impulses proportional to the intensity of the image. These impulses are transmitted from the transmitting antenna of the apparatus to the receiving portion thereof. For industrial television purposes it is simpler to use closed circuit television so that the receiver is directly connected to the transmitting portion of the system. That is, it is not necessary to transmit any signals through the air.

Referring now to FIG. 4, the vertical and horizontal scanning circuits are shown within the dotted line 80 in relation to the cathode ray tube 90. A conventional vertical scanning generator 81 generates a saw tooth wave 82 and has one of its terminals connected to ground. The other terminal of the generator 81 is connected to one end of a potentiometer 83, the other end of which is connected to ground.

The potentiometer 83 has a variable tap 84 which is directly connected to the control electrode of an amplifier tube 85. The cathode of the tube 85 is connected to ground through the parallel combination of an adjustable cathode resistor 86 and a capacitor 87. The anode of the tube 85 is connected to one end of the primary winding of an iron core transformer 88 and the other end of the primary winding is connected to the positive terminal B+ of a source of operating potential for the tube 85. The secondary winding of the transformer 88 is connected to the vertical deflection coil 91 of the cathode ray tube 90.

A conventional horizontal scanning generator 111 generates a series of impulses 112 and has one of its output terminals grounded. The other output terminal of the generator 111 is connected to the control electrode of a tube 113 through a capacitor 114. The control electrode of the tube 113 is connected to ground by means of a resistor 116 and the cathode is connected to ground through the parallel combination of a resistor 117 and a capacitor 118.

The screen grid of the tube 113 is directly connected to the positive terminal of the source of operating potential. The anode of the tube 113 is connected to the junction point 119 of the series-connected primary 121 and 122 of an iron core transformer 123. The secondary winding of the transformer 123 is directly connected to the horizontal deflection coil 92. Connected across a portion of the secondary winding of the transformer 123 is a variable inductor 124.

Connected to one end of the primary winding 121 of the transformer 123 is the anode of a diode 126, the cathode of which applies high voltage to the post-accelerating anode 93 of the cathode ray tube 90.

In operation, the electron beam of the cathode ray tube 90 scans the fluorescent screen 94 thereof in accordance with the signals applied to the vertical and horizontal deflecting coils 91 and 92 respectively. These signals in turn are affected by the series of electrical impulses received from the television pick-up tube and are synchronized therewith to reproduce an image on the fluorescent screen. The aspect ratio of the displayed image of the fluorescent screen 94 depends upon the relative constants of the vertical and horizontal deflecting circuits 80. This aspect ratio may be chosen as desired by properly positioning the movable tap 84 of the potentiometer 83 and the value of the variable inductor 124.

Therefore, an aspect ratio $Wo/Ho$ may be obtained if it is desired to have a final aspect ratio equal to the selected aspect ratio of the field of view. Accordingly, it can be seen that the present invention includes the method of optically changing the selected aspect ratio of the field of view to an intermediate aspect ratio and then electrically changing the intermediate aspect ratio to a final aspect ratio which may if desired be equal to the selected aspect ratio. If the selected aspect ratio is 3/1 for example, this is changed to an intermediate aspect ratio of 1. The intermediate aspect ratio of 1 produces the best resolution for the scanning electron beam of the television pick-up tube. In fact, for the maximum use of the pick-up tube's photo-sensitive surface, it is preferable to use an area which is equivalent to the square which can be inscribed within the circular photosensitive surface of the pick-up tube.

The series of electrical impulses produced by the pick-up tube is equivalent to an electrically transmittable image having the aspect ratio 1. At the receiving end of the television system the aspect ratio is electrically changed from 1 back to 3/1 so that the field of the view is shown as it originally appears. A comparison of the object or field of view 10′ in FIG. 3 with the displayed image on the fluorescent screen 94 of the cathode ray tube 90 in FIG. 4 clearly indicates that the displayed image is an accurate reproduction of the object. The scale of the instrument can be clearly and easily read and it is apparent that an operator having a plurality of cathode ray tubes 90 at one position could simultaneously keep track of instrumentation at remote points of a manufacturing plant.

In order to have the sharpest possible image at the television receiver, it is desirable to have the horizontal resolution of the scanning pattern substantially equal to the vertical resolution of the scanning pattern. The vertical resolution of the scanning pattern is measured by the number of pictorial details or picture elements which may be accommodated in the vertical height of the picture area. Each of the scanning lines is capable of producing one picture element in the vertical direction. However, since the picture elements in the image to be transmitted may not fall directly on the scanning lines, the actual number of picture elements which may be accommodated vertically is less than the number of active scanning lines. Since television pictures are scanned at a rate of approximately 500 horizontal scanning lines, the height of the picture elements is fairly well defined.

The horizontal resolution of the scanning pattern is measured by the number of picture elements which may be accommodated in the horizontal direction, measured in a width equal to the picture height. To use the picture height as a basis for the comparison, makes the horizontal resolution directly comparable with the vertical resolution. Accordingly the total number of picture elements accommodated in the picture width is the horizontal resolution multiplied by the aspect ratio.

The value of the horizontal resolution does not depend on the dimensions of the scanning pattern but rather on the electrical performance of the television system in reproducing rapid changes of voltage whereby the reproducing scanning agent is changed in brilliance as it moves across each line. It is clear that the more elements per unit area that are reproduced at the television receiver, the sharper will be the image.

In view of the above the width of the picture element depends on the frequency band width. For example, if a television system is used with a 4½ megacycle band width, and the frame rate is 30 pictures per second, then there are substantially 9 million black and white alternations per second, or 9,000,000/30=300,000 elements per picture, or 300,000/525=571 elements per line, but all of these are not presented to the eye in each picture or line because part of each are blanked out by the picture framing (blanking) signals.

If it is desired to have picture with square elements having substantially equal vertical and horizontal resolution, the number of picture elements presented to the eye each second is given by the relationship:

$$n\cdot\frac{(w)}{h}n\cdot f\times\frac{1}{k} \qquad (1)$$

wherein $n$ equals the number of scanning lines per frame; $w/h$ equals the aspect ratio of the scanning area; $f$ equals the number of frames per second; and $1/k$ is the unblanked portion. The number of picture elements in each horizontal line must be $$\frac{w}{h}\cdot n$$

to obtain equal vertical and horizontal resolution since a picture having equal width and height would need $n$ elements in each line, and a wider picture needs proportionally more elements in each longer horizontal line.

If F is the maximum frequency available in the picture signal, that is, the band width of the transmitting system, the number of picture elements capable of being generated per second is 2F. In a television system a picture element is different from an optical system wherein a pair refers to a black and white line. Either a black or a white element is a television picture element. Therefore, the following relationship is obtained:

$$F=\frac{(w)}{h}n^2f \qquad (2)$$

In actual practice, Equation 2 is slightly modified by four factors each of which is a little less than unity, so that Equation 2 reads as follows:

$$F=\frac{1}{k}\left(\frac{w}{h}\right)n^2f \qquad (3)$$

where $1/k$ is a function of $m$, $k'$, $k_v$ and $k_h$, in which $m$ is the ratio of the horizontal to vertical resolution; $k'$ is the vertical resolution factor caused by the fact that the scanning line does not coincide precisely with the detail of the object to be resolved; $k_v$ is the fraction of the scanning line during which the scanning spot is active; and $k_h$ is the fraction of the total line-scanning period which is actively devoted to scanning the picture elements.

Due to the anamorphic arrangement described hereinabove, the width of the displayed image is changed. This change of width depends on the power of the anamorphic lens system which is used as the anamorphic adapter. The anamorphic factor "S" depends on the particular lens used. In the lens illustrated in FIG. 3 for example, the anamorphic factor "S" equals $Wo/W$ where W$o$ is the width of the selected aspect ratio of the object and W is the width of the image 21 as shown in FIG. 3. In order to obtain substantially equal horizontal and vertical resolution of the image displayed at the television receiver after an anamorphic lens has been used, the electrical scanning and reproducing apparatus must be arranged to satisfy the following equation:

$$F_s=\frac{1}{K}\left(\frac{w}{h}\right)n^2fS$$

wherein K is a constant depending on various television factors indicated hereinabove. $F_s$ is the band width required for producing an image having uniform resolution after expansion. Equation 3 expresses the band width necessary for uniform resolution of an image having the width W. Since W$o$ is SW, an S times greater band width is required.

It is therefore possible to obtain substantially equal horizontal and vertical resolution of the displayed image even when the selected aspect ratio of the object has been compressed in one direction to produce the electrically transmittable image. For this purpose the TV camera scanning and power supply 40 scans the electrically transmittable image 21 with $n$ scanning lines per frame $f$ frames per second. The resulting electrical impulses produced by the scanning beam are transmitted over transmitting apparatus having a maximum band width $F_s$ which is sufficiently large to satisfy Equation 4 above. That is, since the squeezed image 21 of FIG. 3 has been squeezed in the horizontal direction, it is necessary to increase the horizontal resolution of the displayed image so that it is substantially equal to the vertical resolution thereof. Since modifying or changing the number of scanning lines per second would be impractical due to the standards set up in the television industry, the band width is increased to satisfy the relationship of Equation 4. For example it has been found possible to obtain the substantially equal horizontal and vertical resolution by using a band width $F_s$ of approximately 8 megacycles per second.

It is evident that such a band width of 8 megacycles per second is perfectly satisfactory for closed circuit television which is primarily used in industrial television systems. Under certain circumstances, depending on the object being televised, it may be sufficient to use a smaller band width wherein the horizontal and vertical resolution will not be substantially the same. This might not provide as good definition as the increased band width but it might be satisfactory for certain purposes. Of course it is clear that the receiving apparatus will be able to display the transmitted impulses in the proposed system with sufficient detail.

Referring now to FIG. 5, an electrical schematic diagram is shown which corresponds to a portion of the scanning circuit of FIG. 4. In FIG. 5, the control electrode of the tube 85 is connected to a movable contact 131 of a two layer multi-position switch 132. The fixed contacts of the switch 132 mating with the contact 131 are connected to a plurality of resistors 133 and the last fixed contact is connected to a resistor 134 which in turn is connected to an output terminal of the vertical scanning generator 81.

A second movable contact 141 of the switch 132 is directly connected to one end of the secondary winding of the transformer 123. In place of the adjustable inductor 124 a plurality of inductors 142 are connected to the fixed contacts of the switch 132 which mate with the movable contact 141. The other ends of the inductors 142 are connected together and are connected to a tap of the secondary winding of the transformer 123.

In operation, the movable taps 131 and 141 of the switch 132, which are mechanically connected together, can be moved to any one of a plurality of positions to obtain a desired aspect ratio for the displayed image on the cathode ray tube screen. That is, a single actuator-controlled means is provided in the television receiver for varying the aspect ratio of the displayed image.

It can therefore be seen that by use of the present invention substantially any desired aspect ratio can be obtained at the cathode ray tube screen of the receiving portion of the television system. In a preferred embodiment of the present invention a selected aspect ratio for the field of view and for the displayed image is 2.55:1. It is also preferred to change the selected aspect ratio of the field of view by approximately 25% when the electrically transmittable image is obtained in the image plane of the television camera tube. That is, the intermediate aspect ratio in the television camera tube is 25% different from the selected aspect ratio for the field of view. It is of course apparent that the vertical meridian may be compressed at the transmitting end and expanded at the receiving end rather than the horizontal meridian as illustrated. This will be particularly applicable for industrial gauges which are positioned vertically rather than horizontally.

In the event that the vertical meridian of the object to be televised is to be compressed, it is possible to make the vertical resolution substantially equal to the horizontal resolution by several different methods. For example, the scanning television camera may be rotated 90° so that the scanning lines are vertical rather than horizontal. With this arrangement, the band width F at which the signals are transmitted may be chosen in accordance with Equation 4, hereinabove, so that the anamorphic factor "S" is properly compensated.

Of course, it is apparent that any one of the factors of Equation 4 may be varied to bring about the proper agreement between the horizontal and vertical resolution of the displayed image. For example, the number of scanning lines $n$ may be increased or the number of frames per second may be increased to increase the vertical resolution for the situation where the vertical meridian of the object is compressed by the anamorphic lens.

The present invention has further advantages when the object to be transmitted has already been filmed or when a recorded image has been otherwise provided. In the photographic process, by use of an anamorphic lens, the produced photographic recorded image of the field of view will already be compressed in the desired meridian. Accordingly, it is not necessary to again compress the field of view to obtain a compressed image thereof in the image plane of the television pick-up tube. In this case, the intermediate aspect ratio in the television pick-up tube equals the aspect ratio of the recorded image. The receiver portion of the television system will expand the meridian which has previously been compressed when the image is displayed on the cathode ray tube. Therefore, for showing moving pictures on television, the desired aspect ratio can be obtained without using a compressor lens at the transmitting end, if a compressor lens has been used when the object was photographed.

The present invention has further advantageous uses in the field of theater television. In the conventional theater television systems the image displayed on the fluorescent screen of the cathode ray tube is optically projected on the screen of the theater by means of a Schmidt optical projection system. This system includes a spherical mirror for reflecting the image produced on the cathode ray tube screen and permitting the ultimate optical projection thereof.

With the advent of wide screens in movie theaters it would appear desirable to produce an enlarged wide screen image of the television image. To do this optically would require the combination of the spherical mirror of the Schmidt optical system and some sort of cylindrical lens for expanding a desired meridian of the image. However, with the present invention it is clear that the conventional Schmidt optical projection system may be used with an image such as that shown in FIG. 4. The image can be produced to have the aspect ratio desired for the wide screen and the enlargement and projection thereof by the Schmidt optical system will maintain this aspect ratio at its desired value.

It should be appreciated that the advantages of the present invention cannot be obtained by using a conventional wide-angle lens between the field of view and the television pick-up tube and by cutting off a portion of the image obtained in the pick-up tube. As indicated hereinabove, the preferred aspect ratio for the image in the pick-up tube is a 1:1 aspect ratio. If the wide-angle lens is used, and a portion of the image cut off, then the aspect ratio of the image in the pick-up tube would be far from the desired aspect ratio.

It should also be clear that when a field of view having a selected aspect ratio is transposed into the visible image, the full field of view is obtained in the visible image.

It will be understood that each of the elements described above, or two or more together, may also find a useful application in other types of systems differing from the types described above.

While the invention has been illustrated and described as embodied in a television system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a television system, in combination, cylindrical anamorphic lens system means for transforming a field of view having a selected aspect ratio into an electrically transmittable image having a predetermined different aspect ratio and being uniformly compressed in the direction of its width; television camera means receiving said image and including means for transforming an image having said predetermined aspect ratio into a series of electrical impulses; and television receiver means electrically associated with said television camera means for receiving said impulses and for transforming said impulses into a visible image, said television receiver means including a cathode ray tube producing an electron beam for transforming said impulses into a visible image, and further including first deflecting means for deflecting said beam in the direction of the width at uniform speed along straight lines, second deflecting means for deflecting said beam in a direction corresponding to its height, first control means controlling said first deflecting means for uniformly expanding the width of said visible image, and second control means controlling said second deflecting means for uniformly varying the height of said visible image, and operating means for operating at least said first control means for producing a visible image having substantially the aspect ratio of said field of view.

2. In a television system, in combination, cylindrical anamorphic lens system means for transforming a field of view having a selected aspect ratio into an electrically transmittable image having a predetermined different aspect ratio $w/h$ and being uniformly compressed in the direction of its width; television camera means receiving said image and including scanning means for scanning an image having said predetermined aspect ratio $w/h$ with $n$ lines per second, and $f$ frames per second at a band width of F megacycles per second so as to transform said image into a series of impulses, said band width F being determined by the equation $$F=\frac{1}{k}\left(\frac{w}{h}\right)n^2fS$$

wherein S is the ratio between said selected aspect ratio and said predetermined aspect ratio and $k$ is a television constant; and television receiver means electrically associated with said television camera means for receiving said impulses and for transforming said impulses into a visible image, said television receiver means including a cathode ray tube producing an electron beam for transforming said impulses into a visible image, and further including first deflecting means for deflecting said beam in the direction of the width at uniform speed along straight lines, second deflecting means for deflecting said beam in a directio ncorresponding to its height, first control means controlling said first deflecting means for uniformly expanding the width of said visible image, and second control means controlling said second deflecting means for uniformly varying the height of said visible image, and operating means for operating at least said first control means for producing a visible image having substantially the aspect ratio $$S\left(\frac{w}{h}\right)$$

3. In a television system, in combination, means for transforming a field of view having a selected aspect ratio into an electrically transmittable image having a predetermined different aspect ratio $w/h$ and being uniformly compressed in the direction of its width; television camera means receiving said image and including scanning means for scanning an image having said predetermined aspect ratio $w/h$ with $n$ lines per second, and $f$ frames per second at a band width of F megacycles per second so as to transform said image into a secies of impulses, said band width F being determined by the equation $$F=\frac{1}{k}\left(\frac{w}{h}\right)n^2fS$$

wherein S is the ratio between said selected aspect ratio and said predetermined aspect ratio and $k$ is a television constant; and television receiver means electrically associated with said television camera means for receiving said impulses and for transforming said impulses into a visible image, said television receiver means including a cathode ray tube producing an electron beam for transforming said impulses into a visible image, and further including first deflecting means for deflecting said beam in the direction of the width at uniform speed along straight lines, second deflecting means for deflecting said beam in a direction corresponding to its height, first control means controlling said first deflecting means for uniformly expanding the width of said visible image, and second control means controlling said second deflecting means for uniformly varying the height of said visible image, and operating means connected to said first and second control means for simultaneously operating said first and second control means for producing a visible image having substantially the aspect ratio $$S\left(\frac{w}{h}\right)$$

4. In a television system, in combination, television camera means for transforming an image having a predetermined aspect ratio into a series of electrical impulses, said television camera means being adapted to produce said image from a picture having said predetermined aspect ratio and being a reproduction of a field of view having a selected different aspect ratio, said reproduction being uniformly compressed in one direction; and television receiver means electrically associated with said television camera means for receiving said impulses and for transforming said impulses into a visible image, said television receiver means including a cathode ray tube producing an electron beam; deflecting means for deflecting said beam at uniform speed along straight lines extending in said one direction with respect to said image having said intermediate aspect ratio; and control means controlling said deflecting means for evenly expanding said visible image in said one direction for producing a visible image having substantially the aspect ratio of said field of view and uniform definition.

5. In a television system, in combination, television camera means for transforming an image having a predetermined aspect ratio $w/h$ into a series of electrical impulses, said television camera means being adapted to produce said image from a picture having said predetermined aspect ratio and being a reproduction of a field of view having a selected different aspect ratio, said reproduction being uniformly compressed in one direction; television camera means receiving said image and including scanning means for scanning an image having said predetermined aspect ratio $w/h$ with $n$ lines per second, and $f$ frames per second at a band width of F megacycles per second so as to transform said image into a series of impulses, said band width F being determined by the equation $$F=\frac{1}{k}\left(\frac{w}{h}\right)n^2fS$$

wherein S is the ratio between said selected aspect ratio and said predetermined aspect ratio and $k$ is a television constant; and television receiver means electrically associated with said television camera means for receiving said impulses and for transforming said impulses into a visible image, said television receiver means including a cathode ray tube producing an electron beam; deflecting means for deflecting said beam at uniform speed along straight lines extending in said one direction with respect to said image having said intermediate aspect ratio; and control means controlling said deflecting means for evenly expanding said visible image in said one direction for producing a visible image having substantially the aspect ratio of said field of view and uniform definition.

6. In a television system for producing a television image from a field of view having a selected aspect ratio, in combination, means for light-optically and electron-optically forming of said field of view an image having an intermediate aspect ratio and being evenly compressed in one direction and for transmitting electrical impulses corresponding to said image having said intermediate aspect ratio; means for electrically transforming said electrical impulses corresponding to said image having said intermediate aspect ratio into a visible image having a final aspect ratio different from said intermediate aspect ratio, and including a cathode ray tube producing an electron beam; deflecting means for deflecting said beam at a uniform speed along straight lines extending in said one direction with respect to said image having said intermediate aspect ratio; and control means controlling said deflecting means for evenly expanding said visible image in said one direction for producing a visible image having substantially the aspect ratio of said field of view.

7. In a television system for producing a television image from a field of view having a selected aspect ratio, in combination, anamorphic lens means for forming of said field of view an image having an intermediate aspect ratio and being evenly compressed in one direction; television camera means for receiving said image having said intermediate aspect ratio and for transmitting electrical impulses corresponding to said image having said intermediate aspect ratio; and television receiver means for receiving said electrical impulses and for electrically transforming said electrical impulses corresponding to said image having said intermediate aspect ratio into a visible image having a final aspect ratio different from said intermediate aspect ratio, said television receiver means including a cathode ray tube producing an electron beam; deflecting means for deflecting said beam at uniform speed along straight lines extending in said one direction with respect to said image having said intermediate aspect ratio; and control means controlling said deflecting means for evenly expanding said visible image in said one direction for producing a visible image having substantially the aspect ratio of said field of view and uniform definition.

8. In a television system, in combination, means for transforming a field of view having a selected aspect ratio into an electrically transmittable image having a predetermined different aspect ratio $w/h$ and uniformly compressed in direction of the width $w$; television camera means receiving said image and including scanning means for scanning an image having said predetermined aspect ratio $w/h$ with $n$ lines per second, and $f$ frames per second at a band width of F megacycles per second so as to transform said image into a series of impulses, said band width F being determined by the equation $$F=\frac{1}{k}\left(\frac{w}{h}\right)n^2fS$$

wherein S is the ratio between said selected aspect ratio and said predetermined aspect ratio and $k$ is a television constant; and television receiver means electrically associated with said television camera means for receiving said impulses and for transforming said impulses into a visible image having a final aspect ratio different from said aspect ratio $w/h$ and uniform definition, said television receiver means including a cathode ray tube producing an electron beam; deflecting means for deflecting said beam at uniform speed along straight lines extending over the width of said image having said intermediate aspect ratio; and control means controlling said deflecting means for evenly expanding the width of said visible image.

9. In a television system, in combination, television camera means for transforming an image having a predetermined aspect ratio $w/h$ into a series of electrical impulses, said television camera means being adapted to produce said image from a picture having said predetermined aspect ratio and being a reproduction of a field of view having a selected different aspect ratio, said reproduction being uniformly compressed in one direction; television camera means receiving said image and including scanning means for scanning an image having said predetermined aspect ratio $w/h$ with $n$ lines per second, and $f$ frames per second at a band width of F megacycles per second so as to transform said image into a series of impulses, said band width F being determined by the equation $$F=\frac{1}{k}\left(\frac{w}{h}\right)n^2fS$$

wherein S is the ratio between said selected aspect ratio and said predetermined aspect ratio and $k$ is a television constant; and television receiver means electrically associated with said television camera means for receiving said impulses and for transforming said impulses into a visible image having a final aspect ratio $$S\left(\frac{w}{h}\right)$$

and uniform definition, said television receiver means including a cathode ray tube producing an electron beam; deflecting means for deflecting said beam at uniform speed along straight lines extending over the width of said image having said intermediate aspect ratio; and control means controlling said deflecting means for evenly expanding the width of said visible image.

References Cited in the file of this patent

UNITED STATES PATENTS

| | | |
|---|---|---|
| 1,829,633 | Chretien | Oct. 27, 1931 |
| 1,921,464 | Harries | Aug. 8, 1933 |
| 2,191,565 | Henroteau | Feb. 27, 1940 |
| 2,284,417 | Gray | May 26, 1942 |
| 2,510,670 | Trott | June 6, 1950 |

FOREIGN PATENTS

| | | |
|---|---|---|
| 678,034 | Great Britain | Aug. 27, 1952 |

OTHER REFERENCES

"Television," 2nd ed., 1954, by Zworykin and Morton, published by John Wiley and Sons, Inc., pp. 191 to 194.